United States Patent
Kim et al.

(10) Patent No.: US 10,954,380 B2
(45) Date of Patent: Mar. 23, 2021

(54) HYDROCHROMIC POLYDIACETYLENE POLYMER PATCH AND METHOD OF MANUFACTURING THE SAME

(71) Applicant: INDUSTRY-UNIVERSITY COOPERATION FOUNDATION HANYANG UNIVERSITY, Seoul (KR)

(72) Inventors: Jong-Man Kim, Seoul (KR); Min-Jeong Seo, Seoul (KR); Dong-Hoon Park, Ansan-si (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 272 days.

(21) Appl. No.: 15/772,189

(22) PCT Filed: Oct. 12, 2016

(86) PCT No.: PCT/KR2016/011399
§ 371 (c)(1),
(2) Date: Apr. 30, 2018

(87) PCT Pub. No.: WO2017/073927
PCT Pub. Date: May 4, 2017

(65) Prior Publication Data
US 2018/0282543 A1   Oct. 4, 2018

(30) Foreign Application Priority Data

Oct. 30, 2015 (KR) .................. 10-2015-0151930
Sep. 30, 2016 (KR) .................. 10-2016-0126159

(51) Int. Cl.
| | | |
|---|---|---|
| *C08F 2/46* | (2006.01) | |
| *C08F 2/50* | (2006.01) | |
| *C08G 61/04* | (2006.01) | |
| *C08L 71/02* | (2006.01) | |
| *G01N 21/78* | (2006.01) | |
| *C08J 5/18* | (2006.01) | |
| *G01N 31/22* | (2006.01) | |
| *G06K 9/00* | (2006.01) | |
| *B29C 35/08* | (2006.01) | |
| *B29K 71/00* | (2006.01) | |

(52) U.S. Cl.
CPC .............. *C08L 71/02* (2013.01); *C08J 5/18* (2013.01); *G01N 21/78* (2013.01); *B29C 35/0805* (2013.01); *B29C 2035/0827* (2013.01); *B29K 2071/02* (2013.01); *B29K 2995/0018* (2013.01); *C08J 2371/02* (2013.01); *C08J 2449/00* (2013.01); *G01N 31/222* (2013.01); *G06K 9/00093* (2013.01)

(58) Field of Classification Search
CPC ...... C08J 5/18; C08J 2371/02; C08J 2449/00; C08L 71/02; C08L 49/00; B29K 2995/0018; B29K 2995/207102; G01N 21/78; G01N 31/222; G06K 9/00093; B29C 35/0805; B29C 2035/0827
USPC .................................................. 522/1; 520/1
See application file for complete search history.

(56) References Cited

U.S. PATENT DOCUMENTS

2003/0103905 A1   6/2003   Ribi

FOREIGN PATENT DOCUMENTS

| KR | 100781599 | * | 10/2006 |
| KR | 10-0781599 B1 | | 12/2007 |
| KR | 1020150083814 | * | 6/2015 |
| KR | 10-2015-0083814 A | | 7/2015 |

OTHER PUBLICATIONS

Kim et al, Polydiacetylene Supramolecules Embedded in PVA Film for Strip-type Chemosensors, 2006, Chemistry Letters, vol. 35, No. 6, 560-561 (Year: 2006).*
Kim et al, Polydiacetylene Supramolecules Embedded in PVA Film for Strip-type chemosensors, Chemistry Letters, vol. 35, No. 6, 2006 (Year: 2006).*
Ahn et al, KR100781599 Machine Translation, Oct. 24, 2006 (Year: 2006).*
Xu et al, Polydiacetylene-based colorimetric and fluorescent chemosensor for the detection of Carbon dioxide, Nov. 6, 2013, J. Am. Chem. Soc, 135, 17751-17754 (Year: 2013).*

(Continued)

*Primary Examiner* — Jessica Whiteley
(74) *Attorney, Agent, or Firm* — Sughrue Mion, PLLC

(57) ABSTRACT

A hydrochromic polydiacetylene polymer patch and a method of manufacturing the same are provided. The hydrochromic polymer patch comprises a polymer matrix; and polydiacetylene present in the polymer matrix. The polydiacetylene has an ionic functional group in the repeating unit thereof. The ionic functional group is $R^-M^+$ or $R^+X^-$. $R^-$ is a carboxylate anion, $M^+$ is an alkali metal cation, and $R^+$ is a quaternary ammonium group, and $X^-$ is $F^-$, $Cl^-$, $Br^-$, $I^-$, $PF_6^-$, $BF_4^-$, bis(trifluoromethane)sulfonimide ($Tf_2N^-$), trifluoromethanesulfonate ($TfO^-$), $SCN^-$, or $CH_3COO^-$.

15 Claims, 5 Drawing Sheets

(56) References Cited

OTHER PUBLICATIONS

Kim et al, KR 1020150083814 Machine Translation, Jun. 26, 2015 (Year: 2015).*
Park et al., "Inkjet-Printable Amphiphilic Polydiacetylene Precursor for Hydrochromic Imaging on Paper", Advanced Functional Materials, 2016, vol. 26, No. 4, pp. 498-506 (10 pages total).
Pyo et al., "Sweat pore mapping using a fluorescein-polymer composite film for fingerprint analysis", Chemical Communications, Jan. 6, 2015, vol. 51, No. 15, pp. 3177-3180 (5 pages total).
Seo et al., "Flexible Patch-Type Hydrochromic Polydiacetylene Sensor for Human Sweat Pore Mapping", International Symposium on Macrocyclic and Supramolecular Chemistry, Jul. 10-14, 2016, Korea (2 pages total).
Xu et al., "Visual detection of copper ions based on azide- and alkyne-functionalized polydiacetylene vesicles", Journal of Materials Chemistry, vol. 21, No. 39, Oct. 21, 2011, pp. 15214-15217 ( 5 pages total).
Xu et al., "Polydiacetylene-Based Colorimetric and Fluorescent Chemosensor for the Detection of Carbon Dioxide", Journal of the American Chemical Society, Nov. 6, 2013, vol. 135, No. 47, pp. 17751-17754 (5 pages total).

* cited by examiner

[FIG. 1]
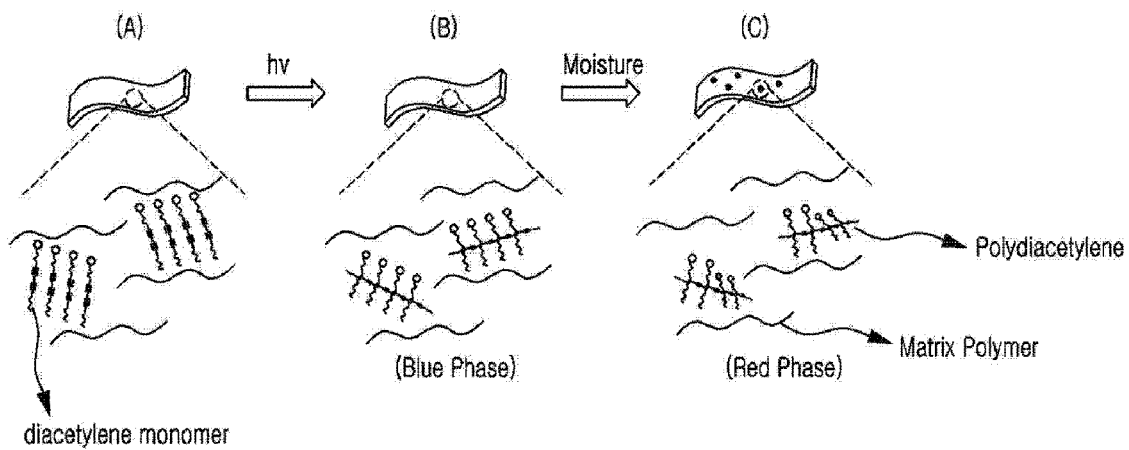
[FIG. 2]
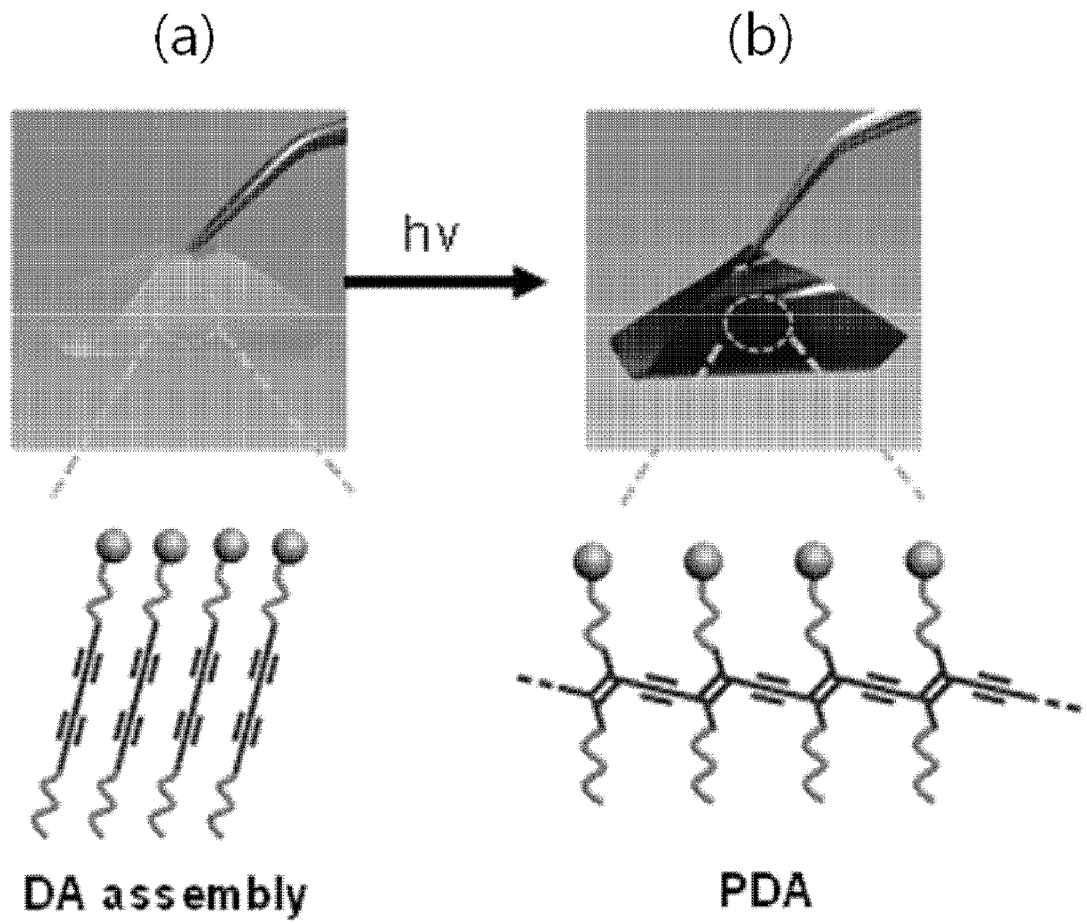

[FIG. 3]
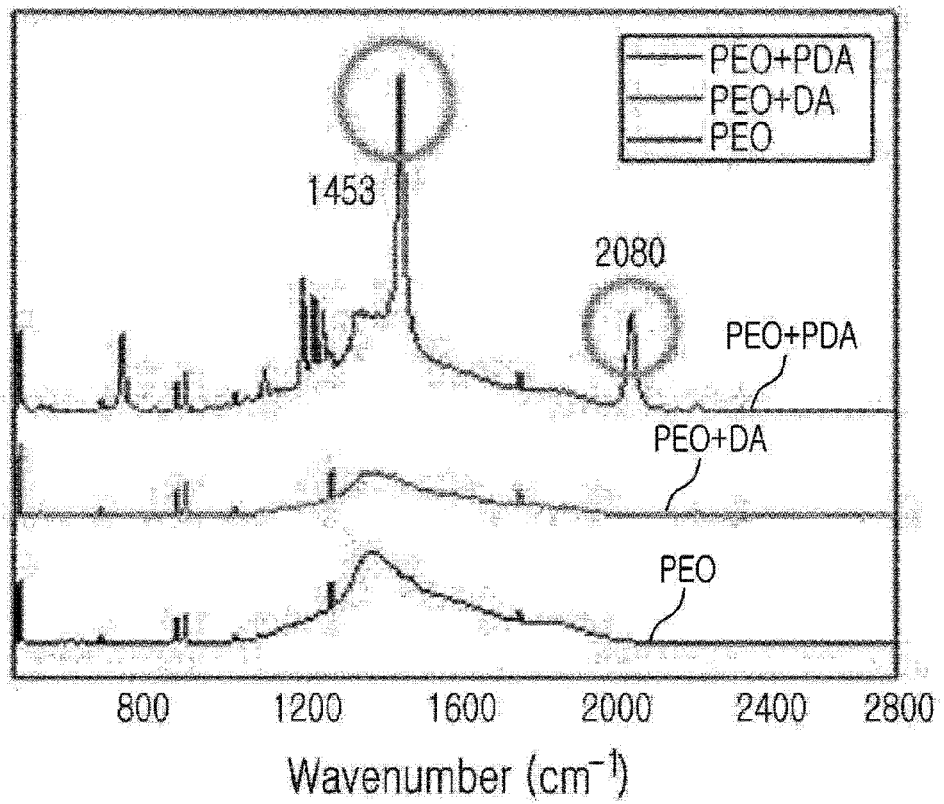
[FIG. 4]
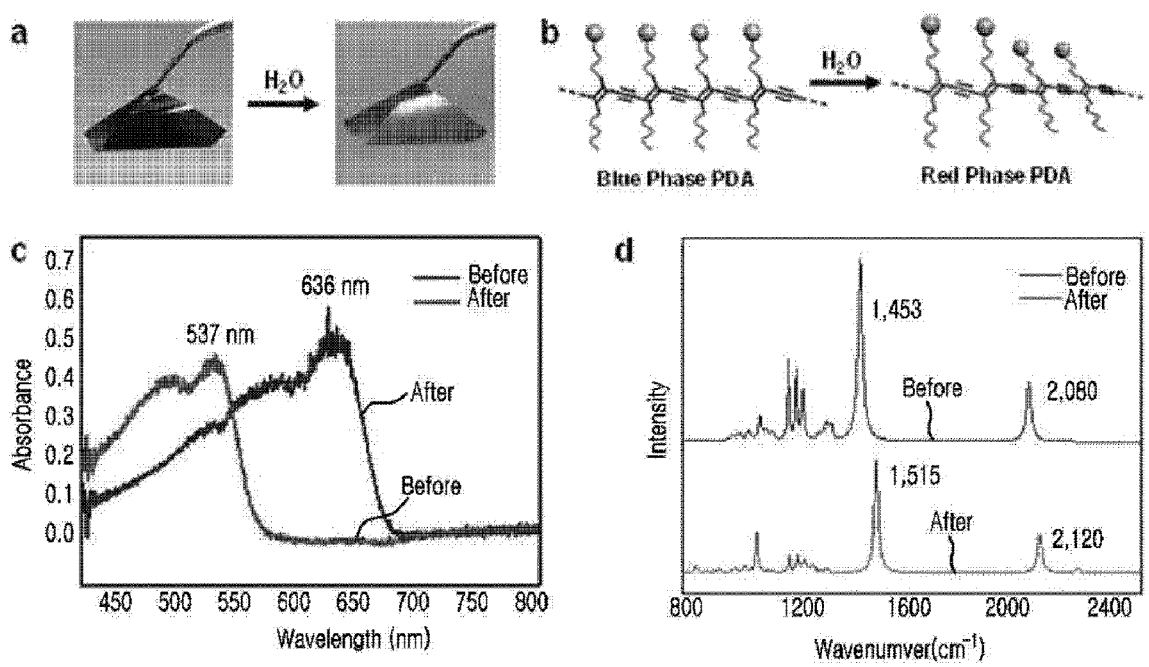

[FIG. 5]
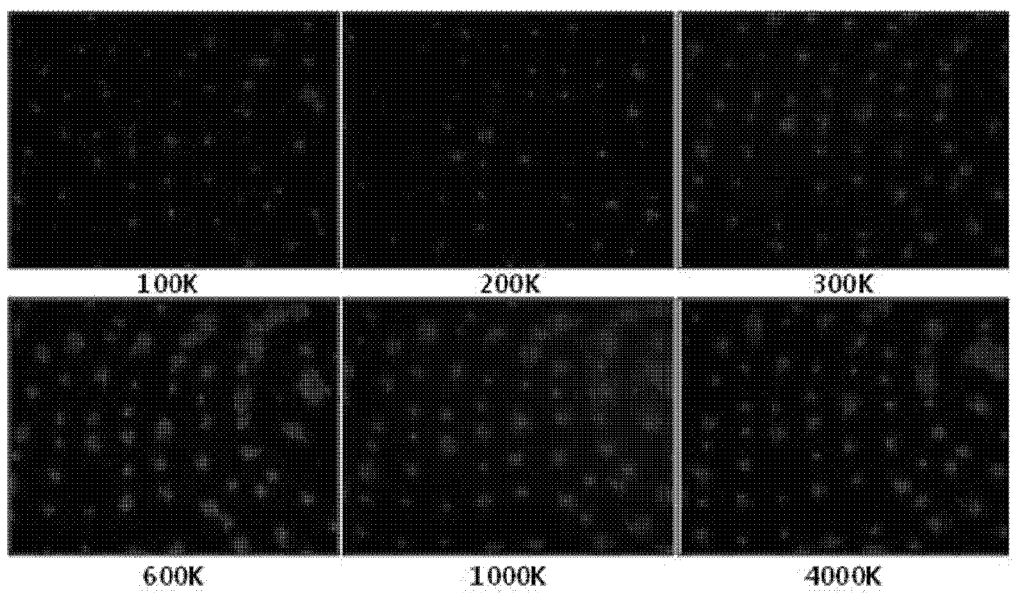
[FIG. 6]
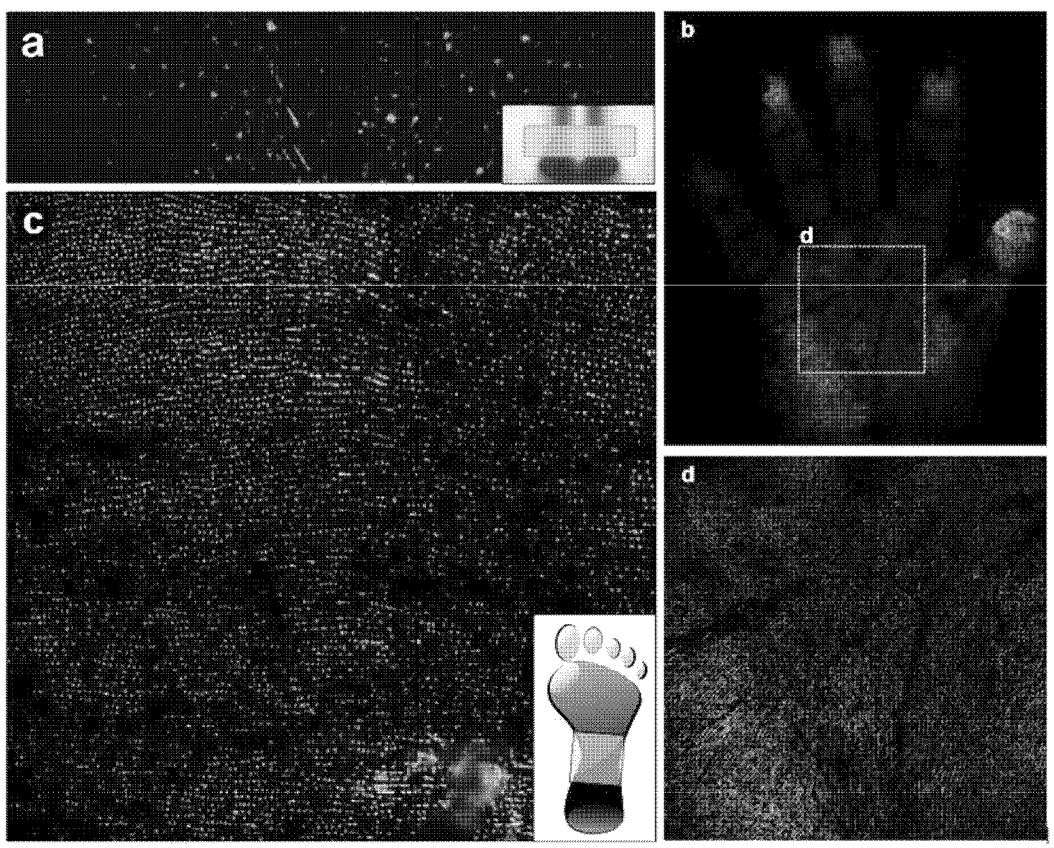

[FIG. 7]
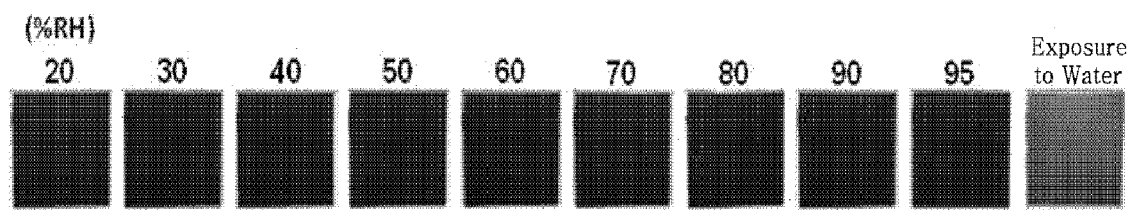
[FIG. 8]
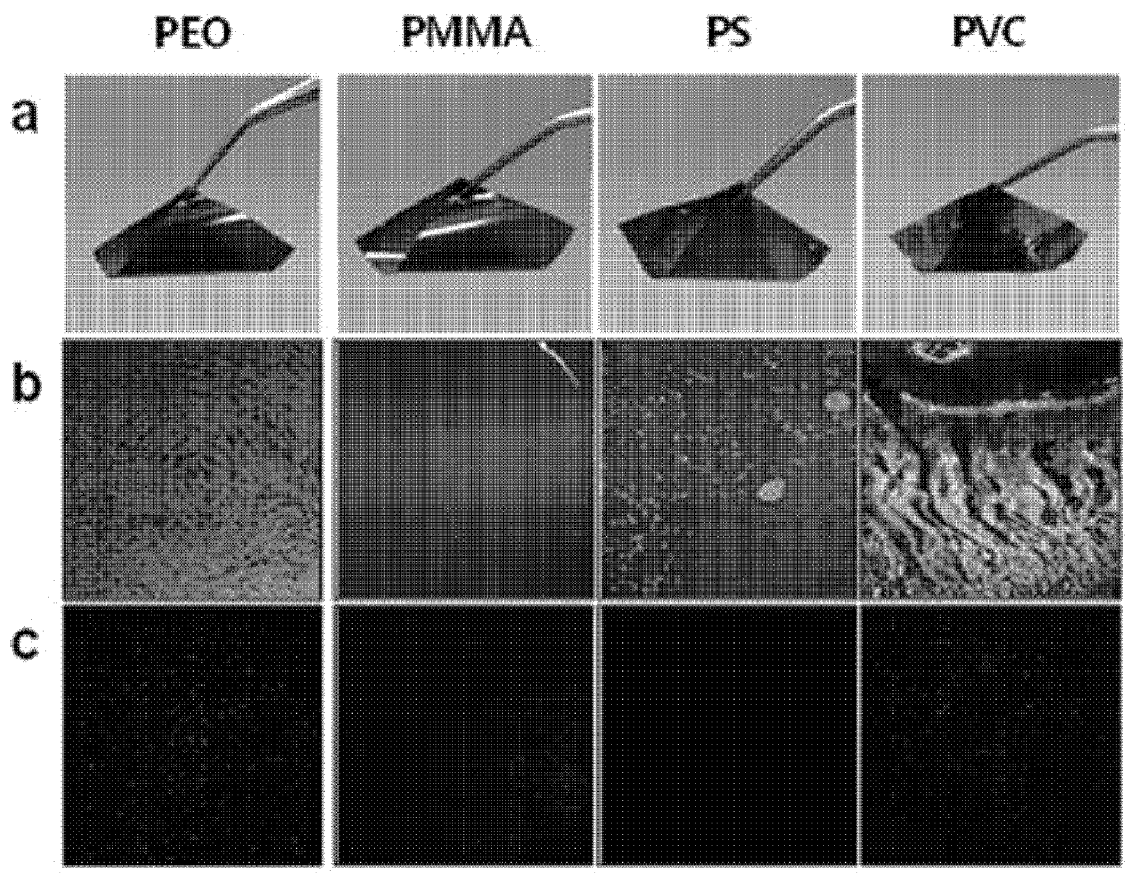

[FIG. 9]
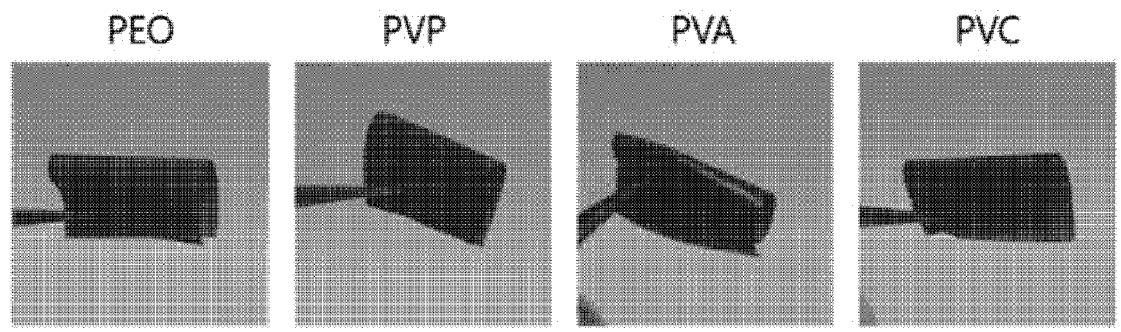
[FIG. 10]
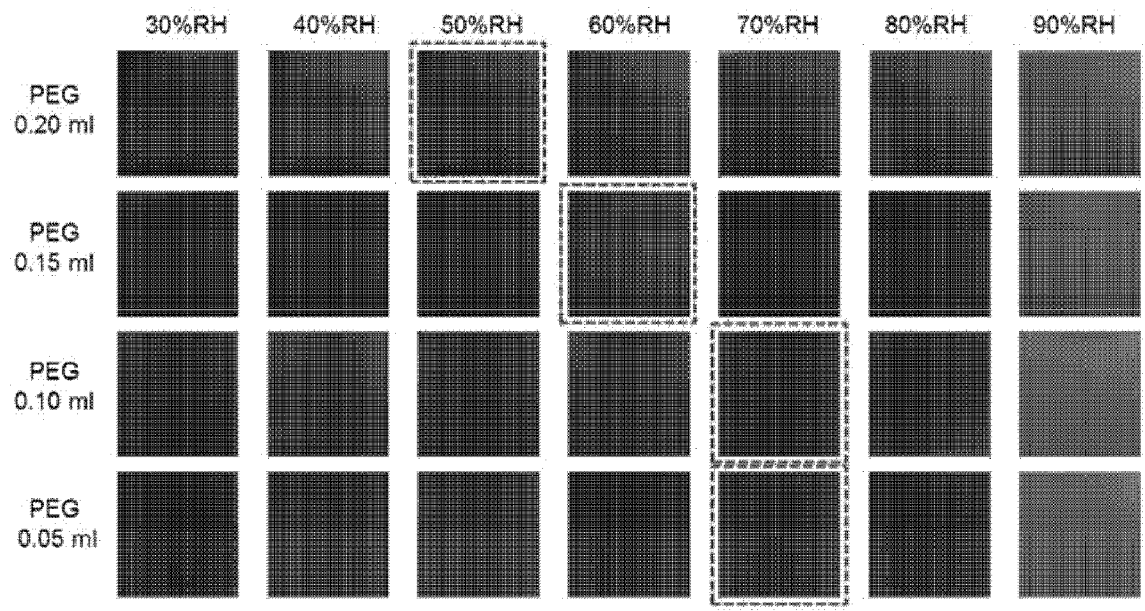

HYDROCHROMIC POLYDIACETYLENE POLYMER PATCH AND METHOD OF MANUFACTURING THE SAME

CROSS REFERENCE TO RELATED APPLICATIONS

This application is a National Stage of International Application No. PCT/KR2016/011399 filed Oct. 12, 2016, claiming priority based on Korean Patent Application No. 10-2015-0151930 filed Oct. 30, 2015 and Korean Patent Application No. 10-2016-0126159 filed Sep. 30, 2016.

TECHNICAL FIELD

The present invention relates to polydiacetylene, and more particularly, to a hydrochromic polydiacetylene polymer patch.

BACKGROUND ART

Polydiacetylene, which is a polymer of diacetylene monomers, is a conjugated polymer prepared by photopolymerization such as irradiation with ultraviolet rays or gamma rays when diacetylene monomers are arranged through self-assembly. Such a polydiacetylene polymer has double bonds and triple bonds alternatively present in a main chain thereof and generally exhibits blue while having a maximum absorption wavelength at about 640 nm. The wavelength of polydiacetylene shifts to a maximum absorption wavelength of about 540 nm and the color thereof is changed by changes in the external environment (heat, solvent, pH, force, molecular recognition, etc.). Various sensors are being researched and developed using such color changeable characteristics of polydiacetylene.

Conventional technologies are disadvantageous in that a prepared film is detached or easily peeled off when glass, a PET film, or an OHP film is used as a base material for preparing a hydrochromic polydiacetylene thin film. In addition, upon fabrication of a large-area thin film, a large amount of hydrochromic polydiacetylene complex is necessary and the generated thin film may be non-uniform. Further, during storage after fabrication of a thin film, the fabricated thin film sensitively reacts with moisture in the atmosphere, whereby a sensor function thereof may be lost.

DISCLOSURE

Technical Problem

Therefore, the present invention has been made in view of the above problems, and it is one object of the present invention to provide a polydiacetylene-containing polymer patch capable of inhibiting separation of polydiacetylene from a base material and having reduced sensitivity to humidity.

It will be understood that technical problems of the present invention are not limited to the aforementioned problems and other technical problems not referred to herein will be clearly understood by those skilled in the art from the disclosure below.

Technical Solution

According to an embodiment of the present invention, a hydrochromic polymer patch is provided. The hydrochromic polymer patch comprises a polymer matrix; and polydiacetylene having a repeat unit represented by Formula 5 below present in the polymer matrix:

[Formula 5]

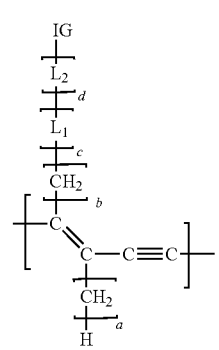

wherein a is an integer of 1 to 20, b is an integer of 1 to 20, $L_1$ is

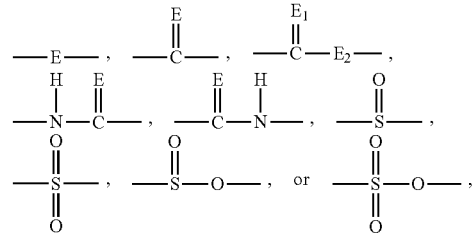

E, $E_1$, and $E_2$ are each independently O or S, c is an integer of 0 to 2, $L_2$ is a C1 to C10 alkylene or C5 to C12 arylene, d is an integer of 0 to 1, IG is $R^- M^+$ or $R^+X^-$ as an ionic functional group, $R^-$ is a carboxylate anion, $M^+$ is an alkali metal cation, and $R^+$ is a quaternary ammonium group, and $X^-$ is $F^-$, $Cl^-$, $Br^-$, $I^-$, $PF_6^-$, $BF_4^-$, bis(trifluoromethane)sulfonimide ($Tf_2N^-$), trifluoromethanesulfonate ($TfO^-$), $SCN^-$, or $CH_3COO^-$.

The polymer may be polyethylene oxide, polyvinyl alcohol, or polyvinyl pyrrolidone. The polymer may be comprised in an amount of about 1.5 to 3.5 parts by weight based on 1 part by weight of the polydiacetylene. The hydrochromic polymer patch may further comprise a hydrophilic oligomer or a plasticizer.

As an example, the polydiacetylene having a repeat unit represented by Formula 5 may be polydiacetylene having a repeat unit represented by Formula 6:

[Formula 6]

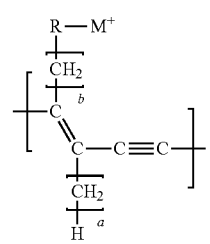

wherein a, b, $R^-$, and $M^+$ may be respectively the same as a, b, $R^-$, and $M^+$ in Formula 5. The $M^+$ may be a cesium ion or a rubidium ion. The polymer may be polyethylene oxide, polyvinyl alcohol, or polyvinyl pyrrolidone.

As another example, the polydiacetylene having a repeat unit represented by Formula 5 may be polydiacetylene having a repeat unit represented by Formula 7:

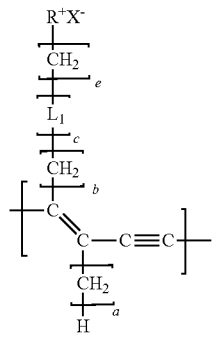

[Formula 7]

wherein a, b, $L_1$, c, e, $R^+$, and $X^-$ may be respectively the same as a, b, $L_1$, c, e, $R^+$, and $X^-$ in Formula 5. Specifically, $R^+$ may be $N^+$—$R_1$-heterocyclic quaternary ammonium represented by Formula 2a below:

[Formula 2a]

wherein * may represent a bond, ring B may be a 5-membered or 6-membered heterocyclic compound which is saturated or unsaturated having 1 to 3 atoms of N and 0 to 1 atoms of O as heteromembers, and $R_1$ may be a C1 to C16 cyanoalkyl, C1 to C16 haloalkyl, C1 to C16 hydroxyalkyl, or C1 to C16 aminoalkyl.

The $N^+$—$R_1$-heterocyclic quaternary ammonium represented by Formula 2a may be $N^+$—$R_1$-heterocyclic quaternary ammonium represented by Formula 2b or 2c below:

[Formula 2b]

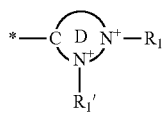

[Formula 2c]

wherein, in Formula 2b, ring C may be a 5-membered or 6-membered unsaturated heterocyclic compound having 2 to 3 atoms of N as heteromembers, in Formula 2c, ring D may be a 5-membered or 6-membered unsaturated heterocyclic compound having 2 to 3 atoms of N as heteromembers, and $R_1$ and $R_1'$ may be each independently a C1 to C16 cyanoalkyl, C1 to C16 haloalkyl, C1 to C16 hydroxyalkyl, or C1 to C16 aminoalkyl.

The $N^+$—$R_1$-heterocyclic quaternary ammonium may be $N^+$—$R_1$-azolium, $N^+$—$R_1$-azinium, or $N^+$—$R_1R_2$-piperazinium. The $N^+$—$R_1$-azolium may be $N^+$—$R_1$-diazolium or $N^+$—$R_1$-triazolium. The $N^+$—$R_1$-diazolium may be $N^+$—$R_1$-imidazolium represented by Formula 2-1 below or $N^+$—$R_1$-pyrazolium represented by Formula 2-2 below:

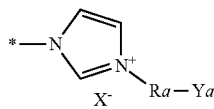

(2-1)

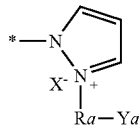

(2-2)

wherein, in Formulas 2-1 and 2-2, $R_a$ may be a C1 to C16 alkylene group, and $Y_a$ may be a cyano group, a halogen, a hydroxyl group, or an amine group.

The hydrochromic polymer patch may exhibit blue. The hydrochromic polymer patch may be a patch for mapping sweat pores.

According to another embodiment of the present invention, a method of manufacturing a hydrochromic polymer patch is provided. The method comprises a step of mixing a diacetylene monomer solution comprising diacetylene monomers represented by Formula 1 below contained in a first solvent with a polymer solution comprising a polymer contained in a second solvent. The mixture is molded into a film. The film is dried to form a polymer patch that comprises a matrix of the polymer and diacetylene monomers self-assembled and arranged inside the matrix.

The diacetylene monomers are photopolymerized by irradiating the polymer patch with ultraviolet rays or gamma rays to form polydiacetylene:

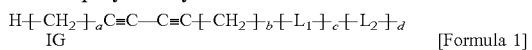

[Formula 1]

wherein a, b, c, d, $L_1$, $L_2$, and IG are respectively the same as a, b, c, d, $L_1$, $L_2$, and IG in Formula 5.

The first and second solvents may be volatile solvents that are miscible with each other. The first and second solvents may be each independently a polar solvent, an amphipathic solvent, or a non-polar solvent having a dipole moment.

The diacetylene monomer represented by Formula 1 may be a diacetylene monomer represented by Formula 3 below:

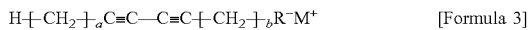

[Formula 3]

wherein a, b, $R^-$, and $M^+$ may be respectively the same as a, b, $R^-$, and $M^+$ in Formula 1.

The diacetylene monomer represented by Formula 1 may be a diacetylene monomer represented by Formula 4 below:

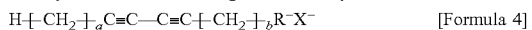

[Formula 4]

wherein a, b, $L_1$, c, e, $R^+$, and $X^-$ may be respectively the same as a, b, $L_1$, c, e, $R^1$, and $X^-$ in Formula 1.

Advantageous Effects

As described above, a polymer patch, a hydrophilic polymer of which includes hydrochromic polydiacetylene, according to the present invention can inhibit separation of polydiacetylene from a base material and can have reduced sensitivity to humidity.

However, it will be understood that effects of the present invention are not limited to those mentioned above and other unmentioned technical effects will be clearly understood by those skilled in the art from the disclosure below.

DESCRIPTION OF DRAWINGS

Example embodiments of the present invention will become more apparent by describing in detail example embodiments of the present invention with reference to the accompanying drawings, in which:

FIG. 1 is a schematic diagram illustrating a method of manufacturing a polydiacetylene-containing polymer patch according to an embodiment of the present invention and hydrochromic reaction in the polymer patch;

FIG. 2 illustrates a photograph of a PEO film (a) containing DA-Im obtained according to Hydrochromic patch manufacture example 1-1b and a photograph of a PEO film (b) containing PDA-Im obtained by irradiating the PEO film (a) with light;

FIG. 3 is a set of graphs illustrating Raman spectra of the PEO film containing DA-Im obtained according to Hydrochromic patch manufacture example 1-1b and the PEO film containing PDA-Im obtained by irradiating the PEO film containing DA-Im with light;

FIG. 4 illustrates a) photographs, b) deformation of a main chain of polydiacetylene, c) UV-vis absorption spectra, and d) Raman spectra before and after applying moisture to the PEO film containing PDA-Im obtained according to Hydrochromic patch manufacture example 1-1b;

FIG. 5 illustrates optical images obtained after a finger touched the PEO film containing PDA-Im obtained according to each of Hydrochromic patch manufacture examples 1-1a to 1-1f;

FIG. 6 illustrates optical images after contacting the nose, the entire palm of a hand, and the sole with the PEO film containing PDA-Im obtained according to Hydrochromic patch manufacture example 1-1b;

FIG. 7 is a set of photographs illustrating relative humidity-dependent hydrochromic degrees of the PEO film containing PDA-Im obtained according to Hydrochromic patch manufacture example 1-1b;

FIG. 8 illustrates a photograph (a) of the polymer film containing PDA-Im obtained according to each of Hydrochromic patch manufacture examples 1-1b, 1-2, 1-3, and 1-4, and an optical image (b) and a fluorescence microscope image (c) after a finger touched the polymer film;

FIG. 9 illustrates a photograph of the polymer film containing PDA-Cs obtained according to each of Hydrochromic patch manufacture examples 2-1 to 2-4; and FIG. 10 illustrates relative humidity-dependent hydrochromic degrees of the polymer film containing PDA-Cs obtained according to each of Hydrochromic patch manufacture examples 3-1 to 3-4.

MODES OF THE INVENTION

Hereinafter, the present invention will be described in detail by describing exemplary embodiments of the invention with reference to the attached drawings. However, the scope of the present invention is not limited to the embodiments described in the present specification and may be embodied in other forms. In the drawings, it will be understood that when a layer is referred to as being "on" another layer or substrate, it can be directly formed on the other layer or substrate or a third layer can also be present therebetween. In embodiments herein, it will be understood that "first", "second", or "third" is not provided to limit constituents and is provided to distinguish constituents from one another.

In the present specification, "alkyl" may refer to an aliphatic hydrocarbon group or a "saturated alkyl" having no double bonds or triple bonds, unless specified otherwise. The saturated alkyl group may be a linear alkyl group.

In the present specification, unless specified otherwise, "alkylene" may refer to a divalent radical of an alkane, which is a saturated hydrocarbon, and may be a linear alkylene.

In the present specification, when the expression "Cx to Cy" is used, it should be understood that all integer carbon numbers between x and y are should be interpreted as described.

In the present specification, "halogen" or "halo" is an element belonging to Group 17 and, particularly, may be fluorine, chlorine, bromine, or iodine.

In the present specification, when the expression "x to y" is used, it should be understood that all numbers between x and y are should be interpreted as described.

Diacetylene Monomer-Containing Polymer Patch

FIG. 1 is a schematic diagram illustrating a method of manufacturing a polydiacetylene-containing polymer patch according to an embodiment of the present invention and hydrochromic reaction in the polymer patch.

Referring to FIG. 1, a polymer patch A including a polymer matrix and diacetylene monomers with an ionic functional group, which are self-assembled and arranged inside the polymer matrix, may be formed.

For example, the polymer patch A may be formed by mixing a diacetylene monomer solution including the diacetylene monomers contained in a first solvent with a polymer solution including a polymer contained in the second solvent, and then molding the mixture in a film shape. The molding in a film shape may be performed by one method selected from the group consisting of drop-casting, injection molding, spin coating on a substrate, ink-jet printing, doctor blade coating, and dip-drawing.

The solvent(s) may be at least partially or substantially removed by drying the polymer patch A including the diacetylene monomers. The drying may be performed at about 1 to 5° C. for about 10 to 14 hours. During such a drying process, the self-assembled state of the diacetylene monomers is maintained, whereby the diacetylene monomer may present in a semi-crystalline or crystalline state. The polymer patch A may be a colorless opaque film.

The diacetylene monomer may be a compound represented by Formula 1 below:

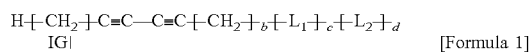

[Formula 1]

wherein a is an integer of 1 to 20. For example, a may be an integer of 6 to 18, particularly an integer of 10 to 12. b may be an integer of 1 to 20. For example, b may be an integer of 2 to 12, particularly an integer of 2 to 8.

In Formula 1, $L_1$ may be

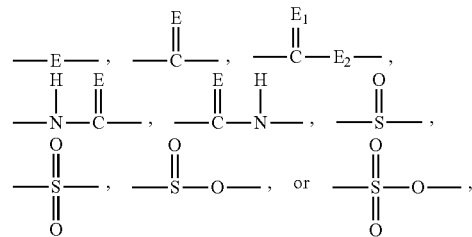

and E, $E_1$, and $E_2$ may be each independently O or S. c may be an integer of 0 to 2. For example, c may be 1.

In Formula 1, $L_2$ may be a C1 to C10 alkylene or C5 to C12 arylene group, particularly $+CH_2+_e$ (wherein e is 1 to 10, for example, 1 to 5, more particularly an integer of 2 to 4) or benzenediyl, particularly 1,3 benzenediyl. d may be an integer of 0 to 1.

IG may be $R^-M^+$ or $R^+X^-$ as an ionic functional group.

In $R^-M^+$, $R^-$ may be a carboxylate anion as an anionic functional group. $M^+$ may be an alkali metal cation as a counter cation, particularly one or more cations of metals selected from the group consisting of cesium, rubidium, potassium, sodium, and lithium. For example, $M^+$ may be a cesium ion or a rubidium ion.

In $R^+X^-$, $R^+$ may be a quaternary ammonium group as a cationic functional group. For example, the quaternary ammonium may be $N^+$—$R_1$-heterocyclic quaternary ammonium represented by Formula 2a below:

[Formula 2a]

wherein ring B may be a 5-membered or 6-membered heterocyclic compound, is a saturated or unsaturated heterocyclic compound, and includes at least one atom of N. Particularly, ring B may include 1 to 3 atoms of N and 0 to 1 atoms of O as heteromembers. In addition, in Formula 2a, $R_1$ may be a C1 to C16 cyanoalkyl, a C1 to C16 haloalkyl, a C1 to C16 hydroxyalkyl, or a C1 to C16 aminoalkyl. Particularly, $R_1$ may be represented by *—$R_a$—$Y_a$. Here, * may represent a bond, and $R_a$ may be a C1 to C16 alkylene group. For example, $R_a$ may be a C1 to C6 alkylene group, particularly a C1 to C3 alkylene group. $Y_a$ may be a cyano group, a halogen, a hydroxyl group, or an amine group.

The $N^+$—$R_1$-heterocyclic quaternary ammonium represented by Formula 2a may be $N^+$—$R_1$-heterocyclic quaternary ammonium represented by Formula 2b or 2c below:

[Formula 2b]

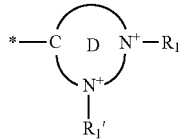

[Formula 2c]

Formula 2b is *—$N^+$—$R_1$-heterocyclic quaternary ammonium. Here, ring C may be a 5-membered or 6-membered unsaturated heterocyclic compound and may include 2 to 3 atoms of N as heteromembers.

In Formula 2c, ring D may be a 5-membered or 6-membered unsaturated heterocyclic compound and may include 2 to 3 atoms of N as heteromembers. In addition, $R_1$ and $R_1'$ may be each independently a C1 to C16 cyanoalkyl, a C1 to C16 haloalkyl, a C1 to C16 hydroxyalkyl, or a C1 to C16 aminoalkyl, and may be represented by *—$R_a$—$Y_a$. $R_a$ and $Y_a$ may be defined may be defined as above.

The $N^+$—$R_1$-heterocyclic quaternary ammonium may be, for example, $N^+$—$R_1$-azolium, $N^+$—$R_1$-azinium, or $N^+$—$R_1R_2$-piperazinium.

The $N^+$—$R_1$-azolium may be $N^+$—$R_1$-diazolium or $N^+$—$R_1$-triazolium. The $N^+$—$R_1$-diazolium may be $N^+$—$R_1$-imidazolium or $N^+$—$R_1$-pyrazolium, the $N^+$—$R_1$-imidazolium may be represented by Formula 2-1 below, and the $N^+$—$R_1$-pyrazolium may be represented by Formula 2-2 below. Meanwhile, $N^+$—$R_1$-triazolium may be represented by Formula 2-3 below:

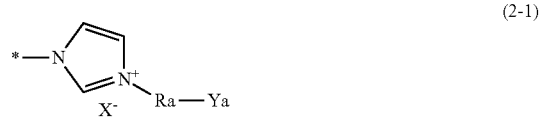

(2-1)

(2-2)

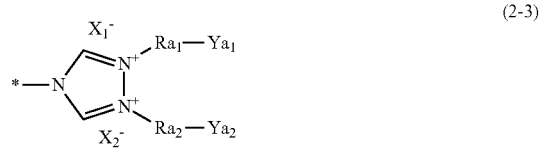

(2-3)

The $N^+$—$R_1$-azinium may be $N^+$—$R_1$-pyridiminium or $N^+$—$R_1$-pyrazinium. The $N^+$—R-pyridiminium may be represented by Formula 2-7 or 2-8 below, and $N^+$—$R_1$-pyrazinium may be represented by Formula 2-9 below:

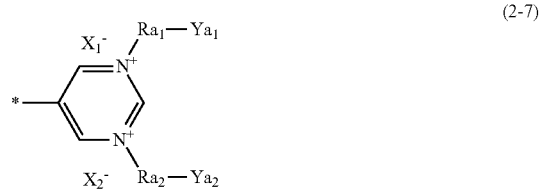

(2-7)

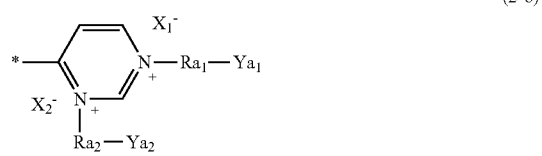

(2-8)

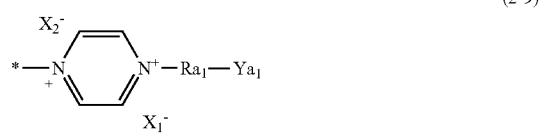

(2-9)

The $N^+$—$R_1R_2$-piperazinium may be *—$N^+$—$R_1R_2$-piperazinium and may be represented by Formula 2-14 below:

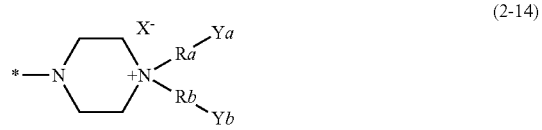

(2-14)

In Formulas 2-1 to 2-3, 2-7 to 2-9, and 2-14, $R_a$ and $Y_a$ may be the same as those described above, $R_{a1}$ and $R_{a2}$ may be each independently a C1 to C16 alkylene group, for example, a C1 to C6 alkylene group, particularly a C1 to C3 alkylene group, and $Y_{a1}$ and $Y_{a2}$ may be each independently a cyano group, a halogen, a hydroxyl group, or an amine group. Rb may be a C1 to C16 alkylene group. Rb may be, for example, a C1 to C6 alkylene group, particularly a C1 to C3 alkylene group. $Y_b$ may be hydrogen, a cyano group, a halogen, a hydroxyl group, or an amine group.

$X^-$, $X_1^-$, and $X_2^-$ may be counter anions. Particularly, $X^-$, $X_1^-$, or $X_2^-$ may be $F^-$, $Cl^-$, $Br^-$, $I^-$, $PF_6^-$, $BF_4^-$, bis(trifluoromethane)sulfonimide ($Tf_2N^-$), trifluoromethanesulfonate ($TfO^-$), $SCN^-$, or $CH_3COO^-$.

As such, the diacetylene monomer contains an ionic functional group at a one-side end of an aliphatic hydrocarbon chain, thereby exhibiting amphipathic properties. Such diacetylene monomers may be self-assembled and disposed between polymer chains of the matrix polymer. In particular, aliphatic hydrocarbon chains including diacetylene groups of the diacetylene monomers may be arranged adjacent to each other by van der Waals interactions, and ionic functional groups may be arranged adjacent to each other at one side of aliphatic hydrocarbon chains.

The matrix polymer may be a polymer having a dipole moment (in other words, a dipole moment of greater than 0) or a polar polymer. In particular, the matrix polymer may be polyethylene oxide, polyvinyl pyrrolidone, polyvinyl alcohol, polyvinyl chloride, polyacrylate, polystyrene, or copolymer thereof having a polar functional group or an electron-attracting group (or an electron-donating group) at a main chain or a side chain thereof, for example an ether group, a carboxyl group, an alcohol group, an amine group, an imine group, an amide group, a pyrrolidone group, a chloride group, or a benzene group at a main chain or a side chain thereof. Further, the matrix polymer may have a hydrophilic functional group at a main chain or a side chain thereof. Here, the hydrophilic functional group may be a polar or charged functional group. Such a hydrophilic polymer may be polyethylene oxide, polyvinyl alcohol, or polyvinyl pyrrolidone.

The polymer may be included in an amount of about 1.5 to 3.5, particularly about 2 to 3 parts by weight, based on 1 part by weight of the diacetylene monomer. The first solvent and the second solvent are solvents miscible with each other, and may be volatile solvents. For example, the first and second solvents may be the same volatile organic solvent. In particular, the first and second solvents may be each independently a polar, amphipathic solvent or a non-polar solvent having a dipole moment (dipole moment is not 0). Such solvents may be varied according to diacetylene monomer types.

The polymer patch A including the diacetylene monomer may further include a hydrophilic oligomer or a plasticizer. In this case, hydrophilicity or flexibility of the polymer patch A may be further increased. The hydrophilic oligomer may be polyethylene glycol having a molecular weight (Mn) of 100 to 1000. The polyethylene glycol may be contained in an amount of about 0.125 to 0.5 part by weight based on 1 part by weight of the diacetylene monomer.

For example, the diacetylene monomer represented by Formula 1 may be represented by Formula 3 below;

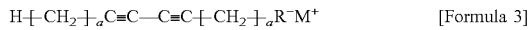  [Formula 3]

wherein a, b, $R^-$, and $M^+$ are respectively the same as a, b, $R^-$, and $M^+$ in Formula 1. The diacetylene monomer may be an alkali metal salt of 10,12-pentacosadiynoic acid (PCDA), an alkali metal salt of 10,12-tricosadiynoic acid (TCDA), or an alkali metal salt of 8,10-heneicosadiynoic acid (HCDA).

Upon use of the diacetylene monomer represented by Formula 1, the first solvent may be a polar or amphipathic solvent. The second solvent may be an amphipathic solvent or water. For example, the first solvent may be an amphipathic solvent and the second solvent may be water. As another example, both the first and second solvents may be amphipathic solvents. Further, both the first and second solvents may be the same solvent. The amphipathic solvent may be, for example, acetone, an alcohol such as methanol, ethanol, or isopropanol, dimethyl ether, or tetrahydrofuran (THF). Meanwhile, the matrix polymer may be polyethylene oxide, polyvinyl alcohol, polyvinyl chloride, or polyvinyl pyrrolidone.

The diacetylene monomer represented by Formula 1 may be prepared by preparing an alkali metal salt solution, e.g., an alkali metal hydroxide aqueous solution, and a diacetylene carboxylic acid monomer solution and adding the alkali metal hydroxide aqueous solution to the diacetylene carboxylic acid monomer solution dropwise while mixing the same. The alkali metal salt may be mixed in a range of 0.1 to 3 moles, preferably 0.5 to 2 moles, with respect to 1 mole of the diacetylene carboxylic acid monomer. In addition, the alkali metal hydroxide and diacetylene carboxylic acid monomer may form the diacetylene monomer represented by Formula 1 by an acid-base reaction.

As another example, the diacetylene monomer represented by Formula 1 may be represented by Formula 4 below:

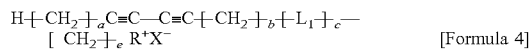  [Formula 4]

wherein a, b, $L_1$, c, e, $R^+$, and $X^-$ are the same as a, b, $L_1$, c, e, $R^+$, and $X^-$ in Formula 1.

When the diacetylene monomer represented by Formula 4 is used, the first solvent may be a non-polar solvent. The second solvent may also be a non-polar solvent. For example, the first and second solvents may be the same solvent. The non-polar solvent may be, for example, chloroform as a non-polar solvent having a dipole moment. Meanwhile, the matrix polymer may be polyethylene oxide.

Polydiacetylene-Containing Polymer Patch

Referring to FIG. 1 again, the dried polymer patch A is irradiated with light to photopolymerize the diacetylene monomers, thereby forming polydiacetylene. Accordingly, a polymer patch B including polydiacetylene present in the polymer matrix may be formed.

The light may be ultraviolet rays, particularly ultraviolet rays of 250 to 260 nm, more particularly ultraviolet rays of 254 nm, or gamma rays, and may be irradiated for 1 to 300 seconds. As a result, polydiacetylene may be formed by photopolymerizing the diacetylene monomers which have been self-assembled and thus disposed adjacent to each other.

The polydiacetylene may have a repeat unit represented by Formula 5 below.

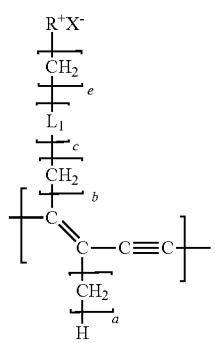

[Formula 7]

a, b, c, d, $L_1$, $L_2$, and IG in Formula 5 may be respectively the same as a, b, c, d, $L_1$, $L_2$, and IG in Formula 1.

The polymer patch B containing such polydiacetylene has a maximum absorption wavelength of about 600 nm to 680 nm, particularly about 620 nm to 660 nm, for example, about 640 nm, and accordingly, exhibits blue because polydiacetylene is a conjugated polymer having a highly 7-conjugated main chain due to double and triple bonds alternatively arranged.

In an embodiment, the polydiacetylene may have a repeat unit represented by Formula 6 below. The polydiacetylene may be a polymerized form of the diacetylene monomers represented by Formula 3:

[Formula 6]

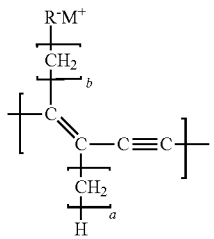

wherein a, b, $R^-$, and $M^+$ are respectively the same as a, b, $R^-$, and $M^+$ in Formula 1.

In another embodiment, the polydiacetylene may have a repeat unit represented by Formula 7 below. The polydiacetylene may be polydiacetylene through polymerization of the diacetylene monomers represented by Formula 4:

[Formula 7]

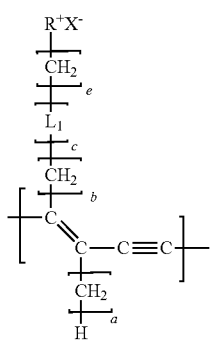

wherein a, b, $L_1$, c, e, $R^+$, and $X^-$ are respectively the same as a, b, $L_1$, c, e, $R^+$, and $X^-$ in Formula 1.

Hydrochromic Reaction of Polydiacetylene-Containing Polymer Patch

Referring to FIG. 1 again, when moisture is added to the polydiacetylene-containing polymer patch B, the polydiacetylene contacting moisture is geometrically deformed. Accordingly, a 7-conjugated main chain structure is broken, whereby a red-based color may be exhibited (C). In other words, a hydrochromic reaction may occur. In particular, when the polydiacetylene contacts moisture, a maximum absorption wavelength of the polydiacetylene may be shifted to blue and may be about 490 to about 590 nm, particularly 520 to about 570 nm, for example, 540 nm, and a color observable with the naked eye may be changed to a red-based color. At the same time, hydrochromic polydiacetylene may generate fluorescence. Accordingly, the polymer patch B containing the polydiacetylene may also be called a hydrochromic patch.

With regard to such hydrochromic reaction, it is presumed that diacetylene monomers, which have not formed polymers and have remained as monomers, form voids while being dissolved in water, which causes geometric deformation of polydiacetylene. However, the present invention is not limited to this theory.

Since the color of the polydiacetylene-containing polymer patch B is changed upon contact with moisture (liquid or gas) as described above, the polydiacetylene-containing polymer patch B may sufficiently perform a function as a moisture sensor, particularly a hydrochromic patch. In particular, the hydrochromic patch may be used to sense humidity or moisture in an organic solvent. Further, the hydrochromic patch may be changed from blue to red even by a very small amount of moisture (several nanoliters of moisture) secreted from sweat pores, thereby capable of being used for fingerprint recognition or as a paper for mapping sweat pores. In particular, the moisture test paper serves to effectively map sweat pores of the entire body such as the palm, the soles of the feet, and the face as well as the fingers, whereby the application fields thereof may be expanded. Since the moisture test paper may be used in analyzing biometric information, such as the distribution of sweat pores in the body, as described above, it may be used in the medical field, the beauty field, or the criminal investigation field. In particular, the moisture test paper may be used in the medical field such as analysis of the distribution of active sweat pores in patients with hyperhidrosis or analysis of sweat pore activity according to age, the cosmetic field such as development of deodorants or perspiration inhibitors, and the criminal investigation field in which sweat pore maps of fingerprints are used. In addition, since the elution position can be grasped accurately by color or fluorescence change caused by moisture eluted from various water pipes, micro cracked structures, and experimental equipment, it can be widely used for commercial purposes. Further, the polymer patch (B) can be produced as a hydrochromic patch having improved ductility as well as a solid hydrochromic patch by controlling the physical properties of the matrix polymer. In the case of the hydrochromic patch having improved ductility, it can be used for the detection of moisture in the curved skin of the face.

Hereinafter, the present invention will be described in more detail with reference to the following Examples. It should be understand that the examples are merely provided to concretely explain the spirit of the present invention and therefore, there is no intent to limit the present invention to the Examples.

DIACETYLENE MONOMER SYNTHESIS EXAMPLES

Synthesis Example 1: Synthesis of DA-Im [3-(Cyanomethyl)-1-(3-(pentacosa-10,12-diynamido) propyl)-1H-imidazol-3-ium bromide]

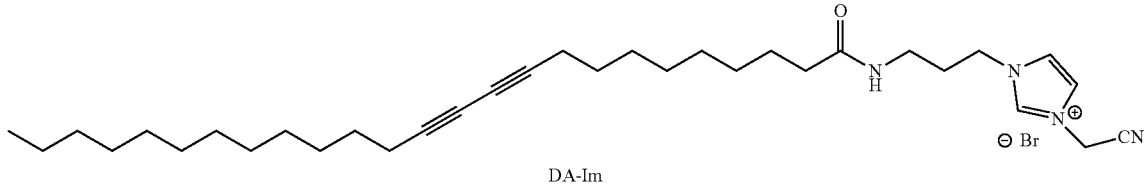 [SMILES: CCCCCCCCCCCCC#CC#CCCCCCCCCC(=O)NCCCn1cc[n+](CC#N)c1 ; [Br-] ; "DA-Im"]

DA-Im

A solution prepared by dissolving 10,12-pentacosadiynoic acid (PCDA, 0.75 g, 2 mmol), N-hydrosuccinimide (NHS, 0.35 g, 3 mmol), and 1-ethyl-3-(3-dimethylaminopropyl)carbodiimide (EDC, 0.77 g, 4 mmol) in 20 ml of methylene chloride was stirred at room temperature overnight. Subsequently, the solution was concentrated in vacuo, and a residue was re-dissolved in ethyl acetate. The resultant solution was fed along with water into a separatory funnel and was allowed to be separated therein. Subsequently, a separated organic solution layer was separately isolated. The organic solution was dehydrated, and then concentrated in vacuo, thereby obtaining 2,5-dioxopyrrolidin-1-yl pentacosa-10,12-diynoate (PCDA-NHS) as a white powder. PCDA-NHS (0.94 g, 2 mmol) and triethylamine (TEA, 0.51 g, 5 mmol) were dissolved in 10 ml of methylene chloride to obtain a first solution, and 1-(3-aminopropyl) imidazole, 0.38 g, 3.00 mmol) was dissolved in 10 ml of methylene chloride to obtain a second solution. The obtained second solution was added to the first solution, followed by stirring at room temperature overnight. Subsequently, the resultant solution was concentrated in vacuo, thereby obtaining a residue. The residue was fed into a silica gel chromatography column (methylene chloride/methanol, 96/4), thereby obtaining N-(3-(1H-imidazol-1-yl)propyl)pentacosa-10,12-diynamide as a white solid (0.77 g, 80%).

N-(3-(1H-imidazol-1-yl)propyl)pentacosa-10,12-diynamide (0.70 g, 1.45 mmol) was added to 20 ml of acetonitrile containing bromoacetonitrile (0.28 g, 2.32 mmol), followed by refluxing while stirring overnight. Subsequently, a solid was obtained through concentration in vacuo. The solid was washed with hexane three times, thereby obtaining DA-Im (0.75 g, 86%) as a yellowish powder. m.p.: 89° C., IR (KBr, cm−1): v max 611, 624, 652, 719, 757, 860, 927, 1022, 1168, 1382, 1423, 1453, 1467, 1538, 1642, 1651, 2267, 2849, 2919, 3070, 3094, 3255, 3358. 1 H NMR (600 MHz, dimethyl sulfoxide-d 6, δ): 9.39 (s, 1H), 7.96 (t, J=6 Hz, 1H), 7.95 (t, J=1.8 Hz, 1H), 7.93 (t, J=1.8 Hz, 1H), 5.63 (s, 2H), 4.22 (t, J=6.6 Hz, 2H), 3.05 (q, J=6 Hz, 2H), 2.26 (t, J=7.2 Hz, 4H), 2.06 (t, J=7.8 Hz, 2H), 1.92 (quint, J=6.6 Hz, 2H), 1.50-.40 (m, 6H), 1.30-.23 (m, 26H), 0.85 (t, J=7.2 Hz, 3H); 13 C NMR (75 MHz, CDCl 3, δ): 174.82, 137.88, 123.53, 123.22, 114.08, 65.50, 65.44, 48.29, 38.71, 36.70, 35.77, 32.14, 29.88, 29.86, 29.72, 29.58, 29.34, 29.24, 29.11, 28.60, 26.04, 22.92, 19.44, 14.37.

Synthesis Example 2: Synthesis of DA-Cs [Cesium salt of 10,12-pentacosadiynoic acid]

0.187 g of CsOH was dissolved in 0.4 mL of deionized water, and then 0.4658 g of 10,12-pentacosadiynoic acid (PCDA) was dissolved in 10 mL of a tetrahydrofuran (THF) solvent. Subsequently, the aqueous CsOH solution was added to the PCDA solution dropwise (5 wt % solution). The resultant mixture was stirred at room temperature for 1 hour to be uniformly mixed. As a result, a transparent homogeneous DA-Cs solution was prepared.

HYDROCHROMIC PATCH MANUFACTURE EXAMPLE

Hydrochromic Patch Manufacture Example 1

DA-Im was dissolved in chloroform, thereby preparing a chloroform solution containing 2 wt % DA-Im (hereinafter referred to as DA-Im solution). Meanwhile, any one polymer of poly(ethylene oxide) (PEO, MW=100K, 200K, 300K, 600K, 1000K, 4000K), poly(vinyl pyrrolidone) (PVP, MW=360K), poly(methyl methacrylate (PMMA, MW=ca. 120K), poly(vinyl chloride) (PVC, MW=ca. 43,000, average MW=ca. 22,000), and polystyrene (PS, MW=280,000) was dissolved in chloroform, thereby preparing a chloroform solution containing a 5 wt % polymer (hereinafter referred to as a polymer solution). The DA-Im solution and the polymer solution were mixed in a volumetric ratio of 1:1, followed by sonication for 20 minutes. The sonicated product was casted on a glass petri dish. Subsequently, a film was obtained by drying at 2° C. for 12 hours. The film was peeled off, thereby obtaining a polymer film containing DA-Im. The polymer film containing DA-Im was irradiated with UV (254 nm, 1 mWcm$^{-2}$) for 10 seconds, thereby polymerizing the DA-Im. As a result, a polymer film containing PDA-Im was obtained.

Hydrochromic Patch Manufacture Example 2

One polymer of poly(ethylene oxide) (PEO, MW=200K), poly(vinyl pyrrolidone) (PVP, MW=360K), poly(vinyl alcohol) (PVA, MW=89K), and poly(vinyl chloride) (PVC, MW=ca. 43K, average MW=ca. 22K) was dissolved in the aforementioned solvent, thereby preparing a 5 wt % polymer solution. Meanwhile, a DA-Cs solution, as a 5 wt % transparent homogeneous solution, obtained according to Synthesis Example 2 of the diacetylene monomer and the polymer solution were mixed in a volumetric ratio of 1:1, followed by sonication for 20 minutes. The sonicated product was casted on a glass petri dish. Subsequently, a film was obtained by drying at 2° C. for 12 hours. The film was peeled off, thereby obtaining a polymer film containing DA-Cs. The polymer film containing DA-Cs was irradiated with UV (254 nm, 1 mWcm$^{-2}$) for 10 seconds, thereby polymerizing the DA-Cs. As a result, a polymer film containing PDA-Cs was obtained.

Hydrochromic Patch Manufacture Example 3

A PDA-Cs-containing polymer film was obtained in the same manner as in Hydrochromic patch manufacture example 2, except that 10 ml of an aqueous 5 wt % PVP solution prepared by dissolving PVP (MW=360K) in distilled water was mixed with 0.20 ml (Manufacture Example 3-1), 0.15 ml (Manufacture Example 3-2), 0.10 ml (Manufacture Example 3-3), or 0.05 ml (Manufacture Example 3-4) of PEG (MW=0.6K) to prepare a polymer solution.

TABLE 1

| hydrochromic patch manufacture example | diacetylene monomer solution | | polymer solution | |
|---|---|---|---|---|
| | diacetylene monomer | solvent | polymer | solvent |
| 1  1-1a | DA-Im | chloroform | PEO (MW = 100K) | chloroform |
|    1-1b |  |  | PEO (MW = 200K) |  |
|    1-1c |  |  | PEO (MW = 300K) |  |
|    1-1d |  |  | PEO (MW = 600K) |  |
|    1-1e |  |  | PEO (MW = 1000K) |  |
|    1-1f |  |  | PEO (MW = 4000K) |  |
|    1-2  |  |  | PMMA (MW = 120K) |  |
|    1-3  |  |  | PS (MW = 280K) |  |
|    1-4  |  |  | PVC (MW = 430K) |  |
| 2  2-1 | DA-Cs | THF, $H_2O$ | PEO (MW = 200K) | $H_2O$ |
|    2-2 |  |  | PVP (MW = 360K) | $H_2O$ |
|    2-3 |  |  | PVA (MW = 89K) | $H_2O$ |
|    2-4 |  |  | PVC (MW = 430K) | THF |
| 3  3-1 |  |  | PVP (MW = 360K) + PEG (MW = 0.6K) | $H_2O$ |
|    3-2 |  |  |  |  |
|    3-3 |  |  |  |  |
|    3-4 |  |  |  |  |

FIG. 2 illustrates a photograph of a PEO film (a) containing DA-Im obtained according to Hydrochromic patch manufacture example 1-1b and a photograph of a PEO film (b) containing PDA-Im obtained by irradiating the PEO film (a) with light.

Referring to FIG. 2, the PEO film (a) contained DA-Im and PEO in a weight ratio of 1:2.5 and was a colorless opaque film with a thickness of about 10 μm. Meanwhile, the film (b) irradiated with UV exhibited blue. Such blue may indicate that the diacetylene (DA-Im) was polymerized and, accordingly, polydiacetylene (PDA-Im) was formed. In addition, it can be confirmed that both the PEO film (a) containing DA-Im and the PEO film (b) containing PDA-Im are flexible films, and visible cracks due to bending were not generated.

FIG. 3 is a set of graphs illustrating Raman spectra of the PEO film containing DA-Im obtained according to Hydrochromic patch manufacture example 1-1b and the PEO film containing PDA-Im obtained by irradiating the PEO film containing DA-Im with light.

Referring to FIG. 3, it can be confirmed that the PEO film (PEO+PDA) containing PDA-Im exhibits characteristic peaks, i.e., a 1453 cm-1 peak representing a conjugated alkene and a 2080 m$^{-1}$ peak representing a conjugated alkyne, compared to a PEO film per se (PEO) and a PEO film (PEO+DA) containing DA-Im. From this result, it can be confirmed that double bonds and triple bonds of polydiacetylene in the PEO film containing PDA-Im are alternatively arranged, which indicates that the polydiacetylene has a highly 7-conjugated main chain.

FIG. 4 illustrates a) photographs, b) deformation of a main chain of polydiacetylene, c) UV-vis absorption spectra, and d) Raman spectra before and after applying moisture to the PEO film containing PDA-Im obtained according to Hydrochromic patch manufacture example 1-1b.

Referring to FIG. 4, the color of the PEO film containing PDA-Im obtained according to Hydrochromic patch manufacture example 1-1b is changed from blue to red by applying moisture (water-promoted blue-to-red color change) (a), and, after drying the moisture, the color is not returned to blue again. Meanwhile, it can be confirmed from the UV-vis absorption spectra (c) that a maximum absorption wavelength of about 636 nm before exposure to moisture shifts to about 537 nm after exposure to moisture. In addition, it can be confirmed from the Raman spectra that 2080 and 1453 cm-1 bands corresponding to alkyne-alkene bands before exposure to moisture respectively shift to 2120 and 1515 cm-1 bands after exposure to moisture i.e., being hydrated. These results may indicate that the main chain of polydiacetylene is distorted due to moisture, which causes partial distortion of the superposition of the 7-orbital array (b).

<Sweat Pore Mapping Example>

The fingertip was gently brought into contact with the PEO film containing PDA-Im obtained according to Hydrochromic patch manufacture example 1-1b to observe a sweat pore mapping degree.

FIG. 5 illustrates optical images obtained after a finger touched the PEO film containing PDA-Im obtained according to each of Hydrochromic patch manufacture examples 1-1a to 1-f. Fluorescent microdots representing sweat-secretory active pores were analyzed using a fluorescence spectrometer (510 to 550 nm excitation).

Referring to FIG. 5, red fluorescence images expressed by sweat can be observed at the positions of sweat pores. The red fluorescence images can be observed in all of the PEO films containing PDA-Im formed by using PEOs having different molecular weights of 100K to 4000K. From these results, it can be confirmed that a hydrochromic patch, which is flexible and sensitive to moisture, may be realized regardless of the molecular weight of a matrix polymer. However, the hydrochromic film may be torn off upon use of a matrix polymer having a low molecular weight (e.g., 100K), and it may be a little difficult to obtain a film with a uniform thickness due to high viscosity of a solution upon use of a matrix polymer having a high molecular weight (e.g., 300K or more).

FIG. 6 illustrates optical images after contacting the nose, the entire palm of a hand, and the sole with the PEO film containing PDA-Im obtained according to Hydrochromic patch manufacture example 1-1b. Fluorescence microdots representing sweat-secretory active pores were analyzed by means of a fluorescence spectroscope.

Referring to FIG. 6, the PEO film containing PDA-Im may almost be completely brought into contact with the curved portions of the human body due to flexibility thereof even when brought into with the bridge of the nose (a), the entire palm (b) including a recessed portion of the palm (d), and a recessed portion (c) of the sole, whereby sweat pore mapping efficiency may be greatly improved.

FIG. 7 is a set of photographs illustrating relative humidity-dependent hydrochromic degrees of the PEO film containing PDA-Im obtained according to Hydrochromic patch manufacture example 1-1b. In particular, hydrochromic degrees when exposed at a specific relative humidity for 5 minutes are illustrated.

Referring to FIG. 7, the PEO film containing PDA-Im obtained according to Hydrochromic patch manufacture example 1-1b did not change its color even when exposed at a relative humidity of about 20 to 95% for 5 minutes. However, the color of the PEO film was immediately changed to red when exposed to a relative humidity of 100%. From these results, it can be confirmed that the hydrochromic patch according to the example of the present invention is not greatly affected by the humidity of the surrounding environment, and change its color only when directly exposed to water.

FIG. 8 illustrates a photograph (a) of the polymer film containing PDA-Im obtained according to each of Hydrochromic patch manufacture examples 1-1b, 1-2, 1-3, and 1-4, and an optical image (b) and a fluorescence microscope image (c) after a finger touched the polymer film.

Referring to FIG. 8, when PEO, PMMA, PS, and PVC were used as a matrix polymer, all films exhibited blue. From this result, it can be confirmed that DA-Im was polymerized by UV and, accordingly, PDA-Im was formed. This may indicate that DA-Im can be self-assembled in the polymer. In addition, when PS and PVC were used as a matrix polymer, it was observed that normal hydrochromic was exhibited even though the films were broken or cracks are generated thereon upon application of a bending force.

Meanwhile, when a finger touched the polymer film containing PDA-Im, a fingerprint including sweat pores was clearly exhibited in both the optical image and the fluorescence microscope image when PEO was used as a matrix polymer, but few sweat pores were exhibited when PMMA and PVC were used as a matrix polymer. In addition, when PS was used, sweat pores were not observed at all. These results were assumed to be due to the hydrophilicity of the matrix polymer. That is, PS is known as a highly hydrophobic polymer, and PMMA and PVC are also known as hydrophobic polymers.

FIG. 9 illustrates a photograph of the polymer film containing PDA-Cs obtained according to each of Hydrochromic patch manufacture examples 2-1 to 2-4.

Referring to FIG. 9, when PEO, PVP, PVA, and PVC were used as a matrix polymer, all films exhibited blue. From this result, it can be confirmed that DA-Cs was polymerized by UV and, accordingly, PDA-Cs was formed. This may indicate that DA-Im can be self-assembled in the polymer. In addition, in all of the cases, excellent flexibility was exhibited without breakage or crack generation upon application of a bending force.

FIG. 10 illustrates relative humidity-dependent hydrochromic degrees of the polymer film containing PDA-Cs obtained according to each of Hydrochromic patch manufacture examples 3-1 to 3-4. In particular, hydrochromic degrees when exposed at specific relative humidity for 5 minutes are illustrated.

Referring to FIG. 10, it can be confirmed that, upon use of PVP as a matrix polymer, a relative humidity value causing hydrochromic reaction is decreased as the content of highly hydrophilic and hygroscopic PEG increases. In particular, hydrochromic reaction starts to appear at 70% RH when 0.05 ml of PEG is added and 0.10 ml of PEG is added, hydrochromic reaction starts to appear at 60% RH when 0.15 ml of PEG is added, and hydrochromic reaction starts to appear 50% RH when 0.20 ml of PEG is added.

Although the present invention has been described in detail with reference to the preferred embodiments, those skilled in the art will appreciate that the scope of the present invention is not limited to the embodiments and various modifications and changes are possible within the technical spirit and scope of the present invention.

The invention claimed is:

1. A hydrochromic polymer patch, comprising:
a polymer matrix including matrix polymer; and
polydiacetylene having a repeat unit of Formula 5 below present in the polymer matrix:

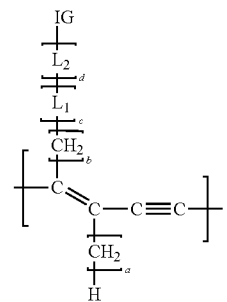

[Formula 5]

wherein a is an integer of 1 to 20, b is an integer of 1 to 20, $L_1$ is

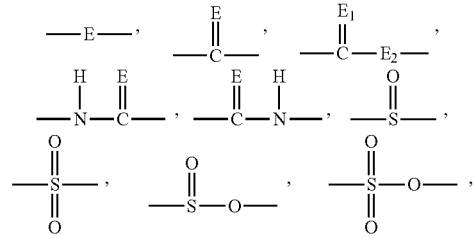

E, $E_1$ and $E_2$ are each independently O or S, c is an integer of 0 to 2, $L_2$ is a C1 to C10 alkylene or C5 to C12 arylene, d is an integer of 0 to 1, IG is $R^+X^-$ as an ionic functional group, $X^-$ is $F^-$, $Cl^-$, $Br^-$, $I^-$, $PF_6^-$, $BF_4^-$, bis(trifluoromethane)sulfonimnide ($Tf_2N^-$), trifluoromethanesulfonate ($TfO^-$), $SCN^-$, or $CH_3COO^-$, and $R^+$ is heterocyclic quaternary ammonium of Formula 2a below:

[Formula 2a]

wherein * represents a bond, ring B is a 5-membered or 6-membered heterocyclic compound which is saturated or unsaturated having 1 to 3 atoms of N and 0 to 1 atom of O as heteromembers, and $R_1$ is a C1 to C16 cyanoalkyl.

2. The hydrochromic polymer patch according to claim 1, wherein the matrix polymer is polyethylene oxide, polyvinyl alcohol, or polyvinyl pyrrolidone.

3. The hydrochromic polymer patch according to claim 1, wherein the matrix polymer is comprised in an amount of about 1.5 to 3.5 parts by weight based on 1 part by weight of the polydiacetylene.

4. The hydrochromic polymer patch according to claim 1, further comprising a hydrophilic oligomer or a plasticizer.

5. The hydrochromic polymer patch according to claim 1, wherein the polydiacetylene having a repeat unit of Formula 5 is polydiacetylene having a repeat unit of Formula 7:

[Formula 7]

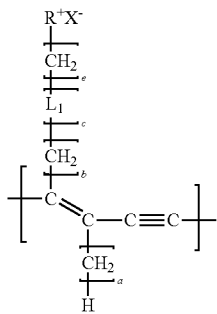

wherein a, b, $L_1$, c, $R^+$, and $X^-$ are respectively the same as a, b, $L_1$, c, $R^+$, and $X^-$ in Formula 5, and e is an integer of 1 to 10.

6. The hydrochromic polymer patch according to claim 1, wherein the heterocyclic quaternary ammonium of Formula 2a is $N^+$—$R_1$-heterocyclic quaternary ammonium of Formula 2b or 2c below:

[Formula 2b]

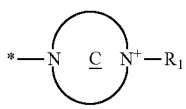

[Formula 2c]

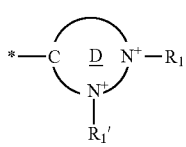

wherein, in Formula 2b, ring C is a 5-membered or 6-membered unsaturated heterocyclic compound having 2 to 3 atoms of N as heteromembers, in Formula 2c, ring D is a 5-membered or 6-membered unsaturated heterocyclic compound having 2 to 3 atoms of N as heteromembers, and $R_1$ and $R_{1'}$ are each independently a C1 to C16 cyanoalkyl.

7. The hydrochromic polymer patch according to claim 6, wherein the $N^+$—$R_1$-heterocyclic quaternary ammonium is $N^+$—R-azolium, $N^+$—$R_1$-azinium, or $N^+$—$R_1R_2$-piperazinium.

8. The hydrochromic polymer patch according to claim 7, wherein the $N^+$—$R_1$-azolium is $N^+$—$R_1$-diazolium or $N^+$—$R_1$-triazolium.

9. The hydrochromic polymer patch according to claim 8, wherein the $N^+$—$R_1$-diazolium is $N^+$—$R_1$-imidazolium of Formula 2-1 below or $N^+$—$R_1$-pyrazolium of Formula 2-2 below:

(2-1)

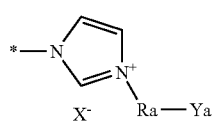

(2-2)

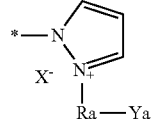

wherein, in Formulas 2-1 and 2-2, $R_a$ is a C1 to C16 alkylene group, and $Y_a$ is a cyano group.

10. The hydrochromic polymer patch according to claim 1, wherein the hydrochromic polymer patch exhibits blue.

11. The hydrochromic polymer patch according to claim 1, wherein the hydrochromic polymer patch is a patch for mapping sweat pores.

12. A method of manufacturing a hydrochromic polymer patch, the method comprising:

a step of mixing a diacetylene monomer solution comprising diacetylene monomers of Formula 1 below contained in a first solvent with a polymer solution comprising a polymer contained in a second solvent;

a step of molding the mixture into a film;

a step of forming a polymer patch that comprises a matrix of the polymer and diacetylene monomers self-assembled and arranged inside the matrix, by drying the film; and a step of photopolymerizing the diacetylene monomers by irradiating the polymer patch with ultraviolet rays or gamma rays to form polydiacetylene:

[Formula 1]

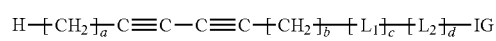

wherein a is an integer of 1 to 20, b is an integer of 1 to 20, $L_1$ is

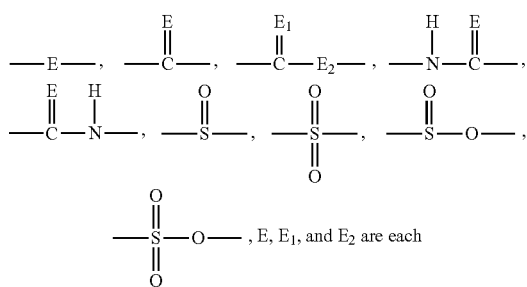

E, $E_1$, and $E_2$ are each independently O or S, e is an integer of 0 to 2, $L_2$ is a C1 to C10 alkylene or C5 to C12 arylene, d is an integer of 0 to 1, IG is $R^+X^-$ as an ionic functional group, $X^-$ is $F^-$, $Cl^-$, $Br^-$, $I^-$, $PF_6^-$, $BF_4^-$, bis(trifluoromethane)sulfonimide ($Tf_2N^-$), trifluoromethanesulfonate ($TfO^-$), $SCN^-$, or $CH_3COO^-$, and $R^+$ is heterocyclic quaternary ammonium of Formula 2a below:

[Formula 2a]

wherein * represents a bond, ring B is a 5-membered or 6-membered heterocyclic compound which is saturated or unsaturated having 1 to 3 atoms of N and 0 to 1 atom of O as heteromembers, and $R_1$ is a C1 to C6 cyanoalkyl.

13. The method according to claim 12, wherein the first and second solvents are volatile solvents that are miscible with each other.

14. The method according to claim 13, wherein the first and second solvents are each independently a polar solvent, an amphipathic solvent, or a non-polar solvent having a dipole moment.

15. The method according to claim 12, wherein the diacetylene monomer of Formula 1 is a diacetylene monomer of Formula 4 below:

[Formula 4]

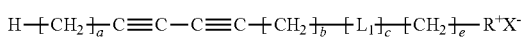

wherein a, b, $L_1$, c, $R^+$, and $X^-$ are respectively the same as a, b, $L_1$, c, $R^+$, and $X^-$ in Formula 1, and e is an integer of 1 to 10.

\* \* \* \* \*